United States Patent [19]

Koval et al.

[11] Patent Number: 5,333,299
[45] Date of Patent: Jul. 26, 1994

[54] SYNCHRONIZATION TECHNIQUES FOR MULTIMEDIA DATA STREAMS

[75] Inventors: Michael J. Koval; William W. Lawton, both of Boca Raton; George A. McClain, Delray Beach; John G. Tyler, Boynton Beach; Scott L. Winters, Plantation, all of Fla.

[73] Assignee: International Business Machines Corporation, Armonk, N.Y.

[21] Appl. No.: 815,652

[22] Filed: Dec. 31, 1991

[51] Int. Cl.⁵ .................................. G06F 1/12
[52] U.S. Cl. ...................... 395/550; 395/275; 370/100.1
[58] Field of Search ............ 340/310 A; 370/100.1; 364/200; 375/106-118; 395/154, 550, 275

[56] References Cited

U.S. PATENT DOCUMENTS

| | | | |
|---|---|---|---|
| 4,357,701 | 11/1982 | Canniff | 370/100 |
| 4,493,027 | 1/1985 | Katz et al. | 364/200 |
| 4,780,891 | 10/1988 | Guérin et al. | 375/111 |
| 4,907,105 | 3/1990 | Kurzweil, Jr. | 360/73.02 |

OTHER PUBLICATIONS

D. P. Anderson et al., "A Continuous Media I/O Server and Its Synchronization Mechanism", Computer Oct. 1991, pp. 51–57.

S. Sparling et al., "Synchronization of Synthesizers Connected via MIDI to Atari Microcomputers", Laboratory Microcomputer vol. 9 No. 1, 1990, pp. 29–35.

H. P. Katseff et al., "On The Synchronization and Display of Multiple Full-Motion Video Streams", Proc. Tricomm '91, IEEE Conf. on Communication Software: Communications for Distributed Applications and Systems, Apr. 1991, pp. 3–9.

R. Govindan et al., "Scheduling and IPC Mechanisms for Continuous Media", Operating Systems Review (SIGOPS), vol. 25, No. 5, Oct. 1991, pp. 68–80.

*Primary Examiner*—Dale M. Shaw
*Assistant Examiner*—Gallrav Bhatia
*Attorney, Agent, or Firm*—Bernard D. Bogdon

[57] ABSTRACT

A personal computer based, multimedia, data processing system includes a software solution to the problem of synchronizing two or more data streams which output data to two or more multimedia output devices. One stream is a master and each other stream is a slave. The master stream generates sync pulses that can be handled in two different synchronization methods, master-slave independent synchronization or master-driven slave synchronization. Sync pulses are generated with a predetermined granularity, and synchronization is achieved when a slave stream is out of tolerance. Adaptive resynchronization may be used to speed up or slow down a slave stream.

12 Claims, 10 Drawing Sheets

DATA STRUCTURES (SYNCHRONIZATION)

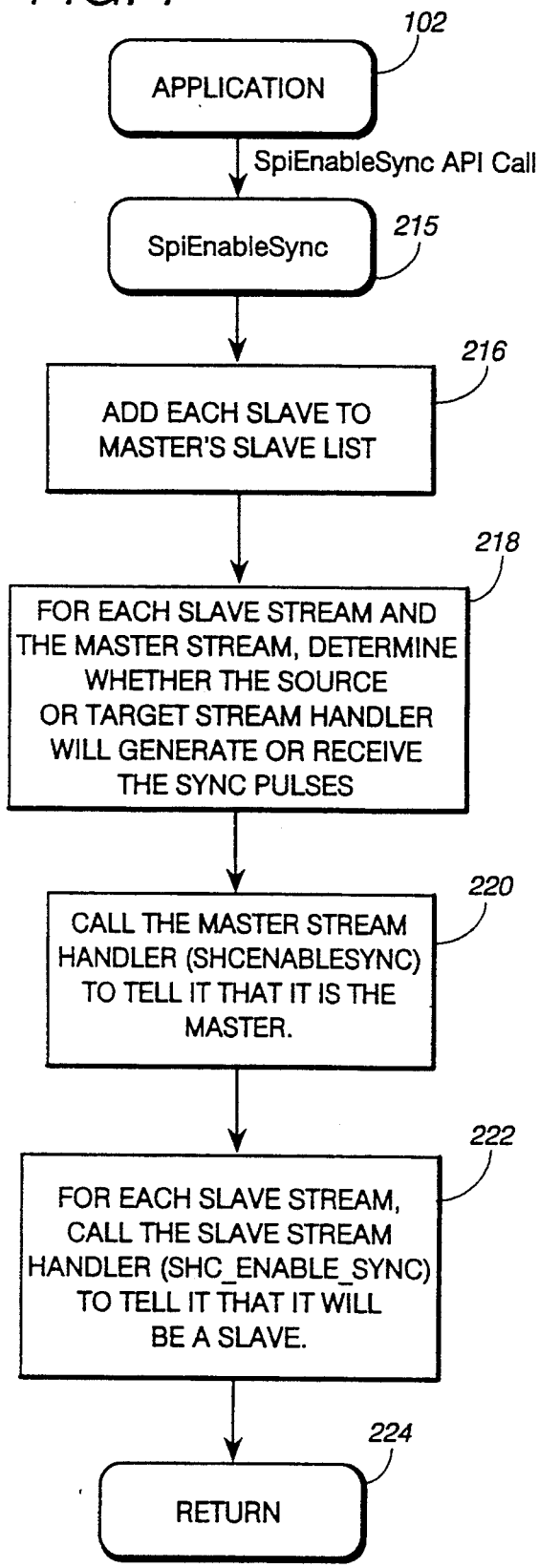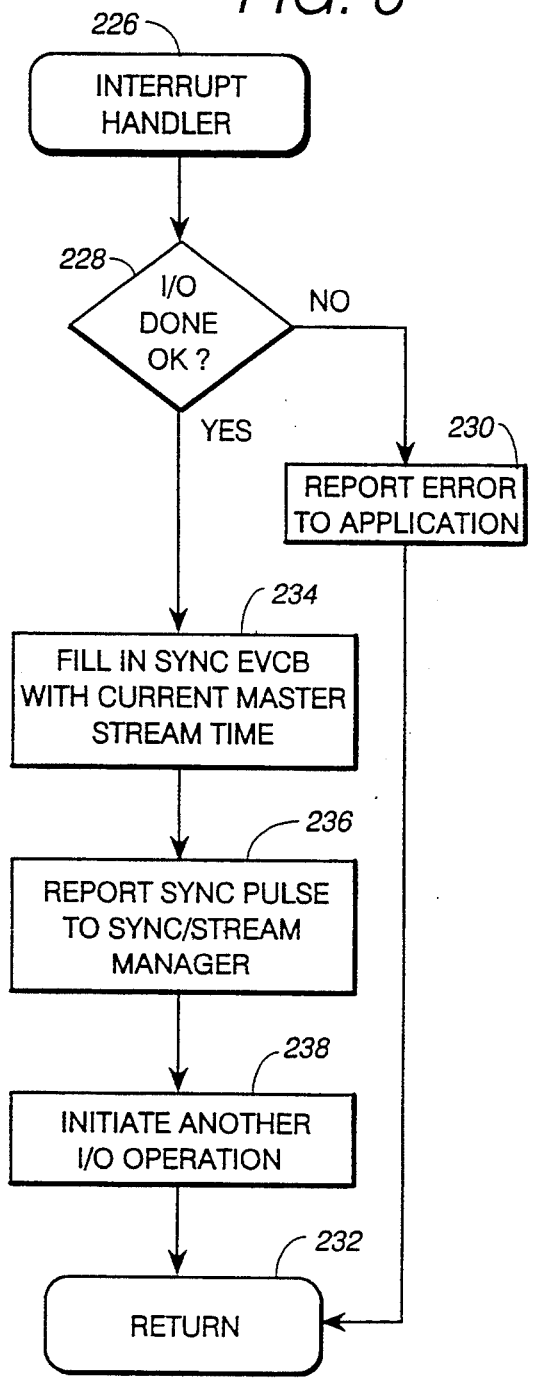

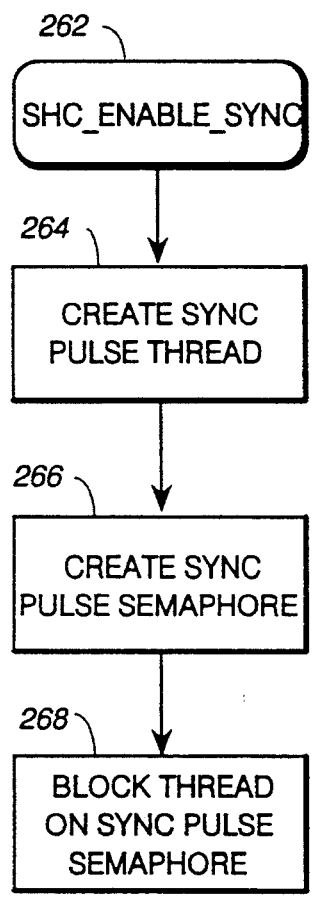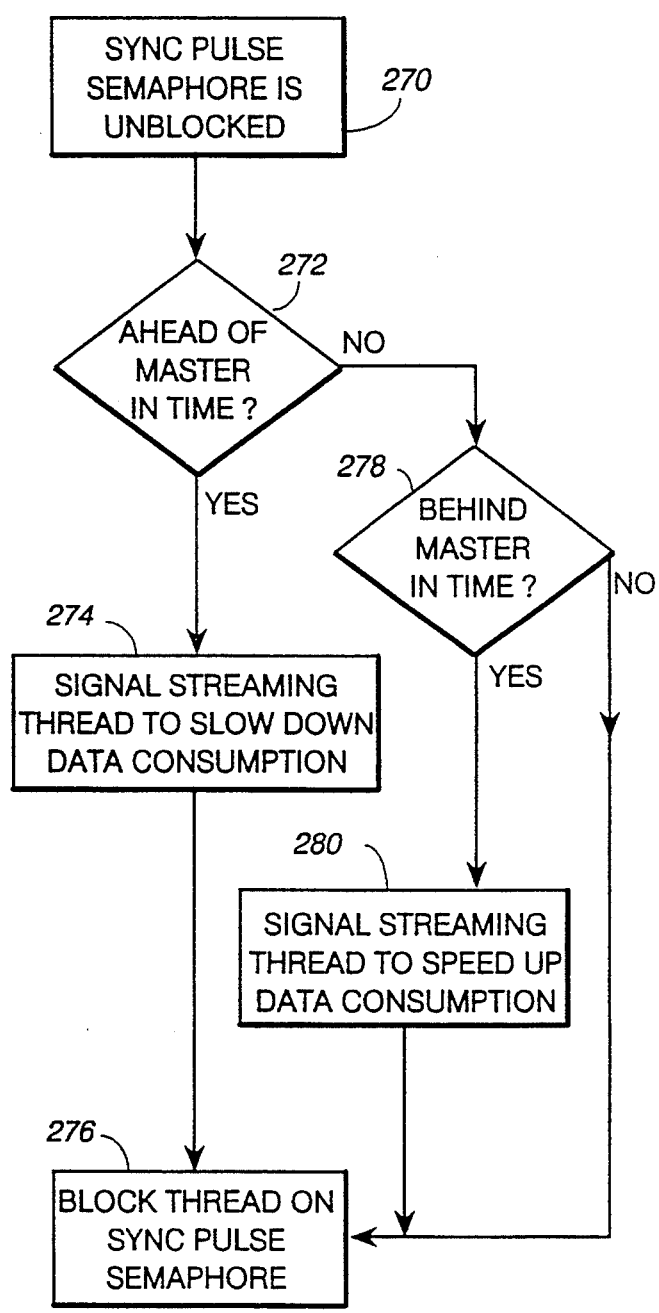

SYNCHRONIZATION TECHNIQUES FOR MULTIMEDIA DATA STREAMS

FIELD OF THE INVENTION

This invention relates to the field of data processing, and, more particularly to synchronization techniques for multimedia data streams.

RELATED APPLICATION

The present application is related to application Ser. No. 07/816,517, filed on even data herewith, for "PERSONAL COMPUTER WITH GENERALIZED DATA STREAMING APPARATUS FOR MULTIMEDIA DEVICES" by M. J. Koval et al, and assigned to the assignee of the present application. Such related application is incorporated herein by reference.

BACKGROUND OF THE INVENTION

A multimedia system is designed to present various multimedia materials in various combinations of text, graphics, video, image, animation, sound, etc. Such a system is a combination of hardware and software. The hardware includes a personal computer to which various multimedia devices can be attached. The hardware runs under the control of an operating system and multimedia application programs.

Multimedia applications impose heavy demands on an operating system to move large amounts of data from device to device, from system memory to a device, or vice-versa, in a continuous, real-time manner. Multimedia systems must support a flexible yet consistent means for transporting these large data objects, and control this activity accurately in real time.

The ability to synchronize events is critical to successful multimedia application execution. For example, the application author may decide to display a certain bitmap (e.g. an image of fireworks bursting) at precisely the same time as an audio waveform is played (e.g. a specific cymbals crash during the "Star Spangled Banner"). From a standard OS/2 application perspective, these events might be controlled by two independent threads, or by a single thread, but there is no way for either of these approaches to guarantee that both events will occur within, say, 6 msec of each other. If there is a time delay of 100 msec between events, the user may or may not notice the events are not quite synchronized. If the delay exceeds 500 msec the user will definitely notice the loss of synchronization.

Multimedia extensions for an operating system such as IBM OS/2, Version 2.0 operating system, need to provide the capability of synchronizing two or more data streams (i.e. audio data streams with video data streams). This requires that the mechanism for doing this must be consistent and generalized across a wide variety of multimedia devices as well as data types. The mechanism must be independent of any specific device operations and flexible in synchronization granularity within the limitations of the specific hardware device involved.

SUMMARY OF INVENTION

The above identified related application discloses a personal computer based multimedia system having OS/2 operating system extensions including a stream manager which performs two primary functions. The first function is to control data streaming so as to provide continuous, real-time data streaming. The inventive aspects of the first function are covered by the above-identified related application. The second primary function involves synchronizing data streams and the inventive aspects of such function are the subject of this present application.

In accordance with one feature of the invention, a generalized synchronization mechanism provides a master-slave relationship between two multimedia output devices in a device independent manner. This mechanism allows for two types of synchronization. The first is master-slave independent synchronization, whereby, two independently driven data streams can be synchronized. The second is master-driven slave synchronization. This consists of one or more slave data streams that are driven by a master data stream, thereby, providing synchronization between the streams. This mechanism also provides an absolute tolerance granularity by which an adaptive resynchronization mechanism can be utilized to resynchronize two or more data streams gradually over a period of time.

In accordance with another feature of the invention, a master/slave relationship establishes a "chain of command" for controlling synchronized events. The relationship is of the 1:N variety, where one entity (the synchronization "master") controls the behavior of one or more subordinate entities (the "slaves"). The relationship is established using an sync group creation command (i.e. the SpiEnableSync API in OS/2 MPM/2) and must designate one stream as the master and one or more streams as slaves. Real-time information, transmitted from the master to all slaves via sync pulses, gives each of the slaves the current time in the time base of the 1/3000 second time unit. This time information (sync pulse) allows each slave stream handler to adjust the activity of that stream so that synchronization can be maintained.

DRAWINGS

Other objects and advantages of the invention will be apparent from the following description taken in connection with the accompanying drawings wherein:

FIGS. 7–12 are flow charts of various operations.

DETAILED DESCRIPTION

MULTIMEDIA SYSTEM

Figure 1:
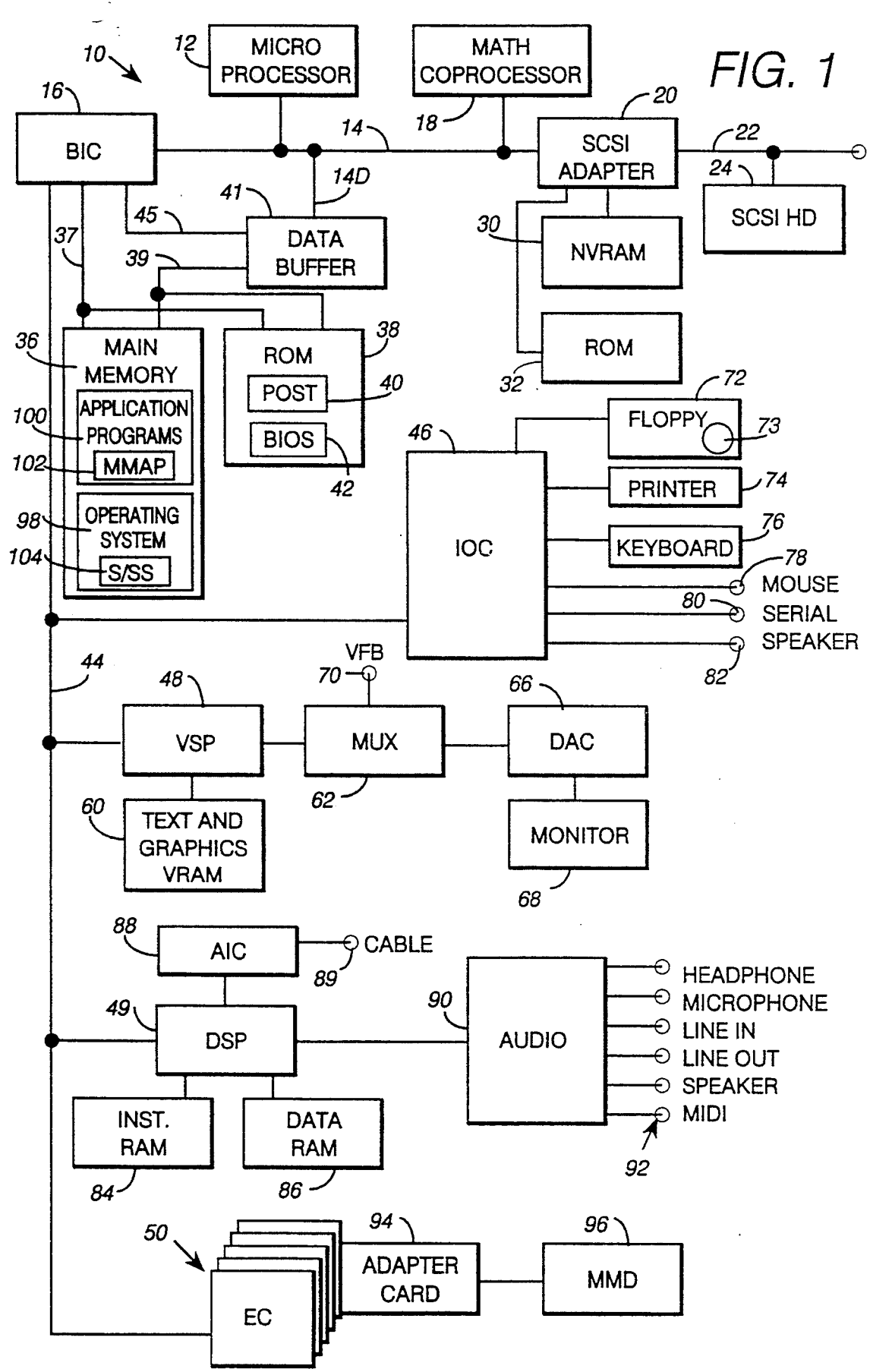
FIG. 1 is a block diagram of a data processing embodying the invention.

Referring now to the drawings, and first to FIG. 1, there is shown an exemplary data processing system comprising a personal computer 10 operable under a multitasking operating system such as OS/2 Version 2.0, to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 or a 80486 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a NVRAM 30 and to a read only memory (ROM) 32.

BIC 16 performs two primary functions, one being that of a memory controller for accessing a main memory 36 and a ROM 38. Main memory 16 is a dynamic random access memory (RAM) that comprises stores data and programs for execution by microprocessor 12 and math coprocessor 18. ROM 38 stores a POST program 40 and a BIOS 42. POST program 40 performs a standard power-on, self-test of the system when computer 10 is started by turning the power on or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an input/output controller (IOC) 46, a video signal processor (VSP) 48, a digital signal processor (DSP) 49, and a plurality of expansion connectors (EC) or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of plurality of I/O devices including a floppy disc drive 72 designated as the A:- drive, a printer 74, and a keyboard 76. Drive 72 comprises a controller (not shown) and a removable floppy disc or diskette 73. IOC 46 also is connected to a mouse connector 78, a serial port connector 80, and a speaker connector 82 which allow various optional devices to be connected into the system.

DSP 49 is further connected to an instruction RAM 84, a data RAM 96, an analog interface controller (AIC) 88, and an audio controller (90). RAMS 84 and 86 respectively hold instructions and data used by DSP 49 for processing signals. Audio controller 90 controls various audio inputs and outputs and is connected to a plurality of connectors 92 by which various devices can be connected to the system. Such devices include a headphone, a microphone, a speaker, a musical instrument digitizing interface (MIDI), and devices requiring an audio line-in and line-out functions. Various other multimedia devices (MMD) 96 can be also attached to the system through an EC 50 and adapter card 94.

Memory 36 stores various programs for execution in the system, which programs include application programs 100, including multimedia application programs (MMAP) 102, and an operating system 98 having extensions thereto including a sync/stream sub-system (S/SS) 104. It is to be noted that while FIG. 1 illustrates an exemplary multimedia system, the operating system is general purpose and is designed to run or control data processing systems having configurations that are different from the one shown in FIG. 1. The invention is embodied primarily in S/SS 104 and its interaction with operating system 100, which will now be described.

SYNC/STREAM SUB-SYSTEM

Figure 2:
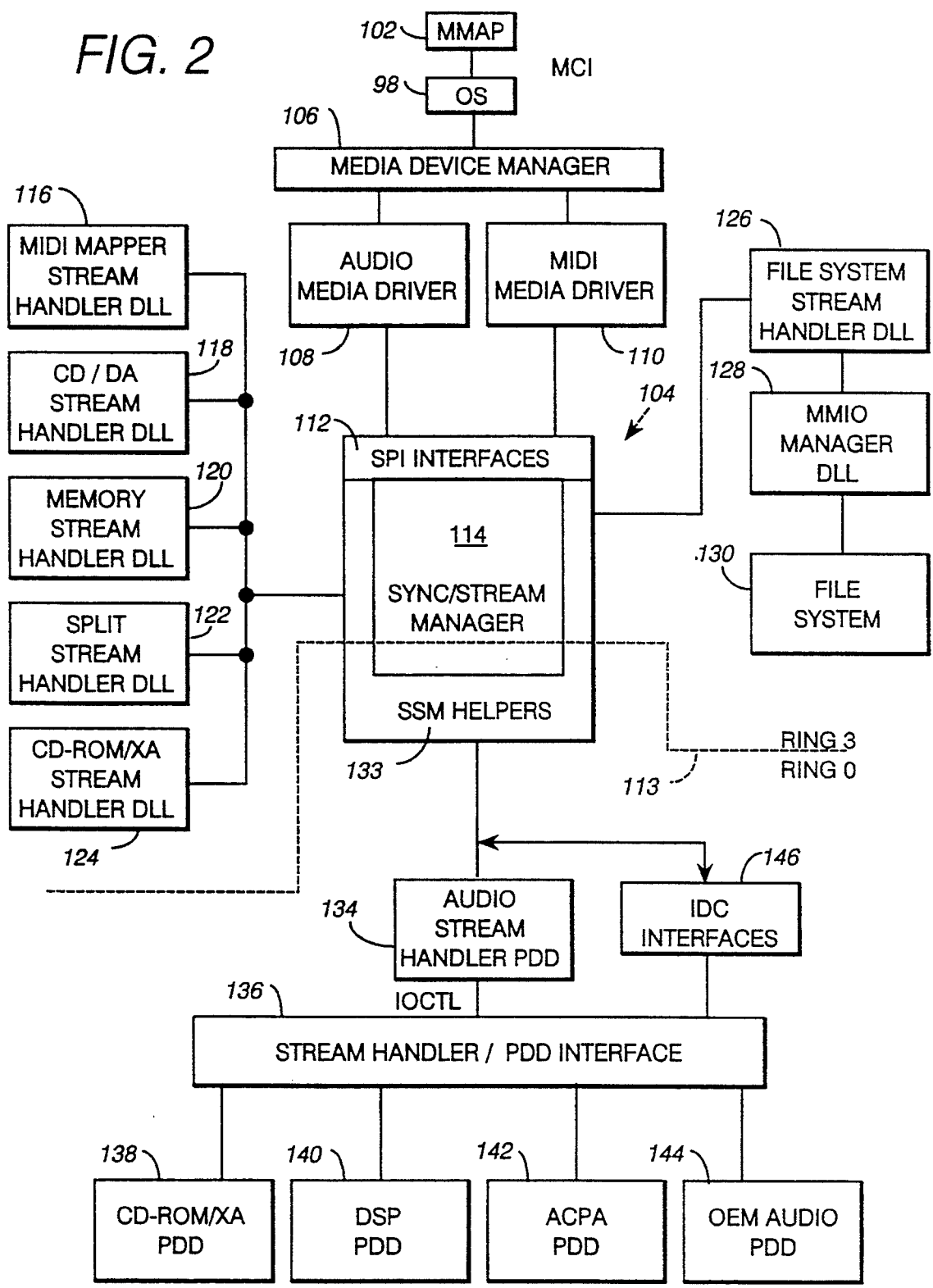
FIG. 2 is a block diagram of sync/stream subsystem architecture embodied in the system shown in FIG. 1.

Referring to FIG. 2, multimedia application programs 102 execute at a layer above operating system 98 and communicate through multimedia control interface (MCI) by sending MCI commands for controlling devices in the multimedia environment. Some of the basic commands are pause, play, record, resume, seek, save, set, stop, etc. Such commands are routed by the operating system 98 to a media device manager (MDM) 106. The application programming model for MMAPs is a logical extension of the OS/2 Presentation Manager programming model, incorporating both object oriented messaging constructs and procedural (call and return) programming interfaces. The MCI provides a view to application developers and users similar to that of a video and audio home entertainment system. Operations are performed by controlling the processors of media information known as media devices. Media devices can be internal or external hardware devices, or there can be software libraries that perform a defined set of operations by manipulating lower-level hardware components and system software functions. Multiple media devices may be included in a scenario, and they can be allocated and controlled as a group for the purpose of synchronized playback.

Multimedia applications must control two aspects of real time system behavior, the transfer of large amounts of data from one device to another and the synchronization of events that are related. Events under the control of the program must be perceived to be under the direct control of the user, and the underlying system functions facilitate and ensure that these events occur in a predictable, real-time manner. Multimedia application authors should write programs that operate on a real-time clock basis, rather than an approximate clock that could allow events to occur within windows of probability.

The MCI has two levels of dynamic link libraries (DLLs) comprising MDM 106 and media drivers including an audio media driver 108 and a MIDI media driver 110. MDM 106 provides resource management for media devices. It resolves contention for access to media devices and provides the application developer a view of resources that is independent of hardware. The media drivers are dynamic link libraries that implement the functionality of media devices. Media drivers invoke the services of hardware devices or software to implement their functionality. The media drivers do not directly control the hardware devices. Instead, they pass commands to S/SS 104 through a stream programming interface (SPI) 112 to a sync/stream manager (SSM) 114 which controls synchronization and streaming activities. SSM 114 performs two primary functions, the first being to control data streaming to provide continuous, real-time data streaming the inventive aspects of which are the subject of the above-identified related application. The second primary function involves synchronizing data streams and details of such function are covered by the present application.

Stream handlers are required at both the system kernel level and the application level. Some data streams are best controlled by a direct connection between a stream handler and the physical device driver at the Ring 0 priority level Such stream handler communicates with the PDD using a common interface based on OS/2 Interdevice Driver Communication (IDC). Other data streams are not associated with a data source or target that can be mapped to a specific physical device and can be controlled at the Ring 3 priority level by a DLL. Dotted line 113 generally indicates which items operate at the different priority levels. Within SSM 114, some routines operate at one level and other routines operate at the other level, as appropriate to the task at hand.

Each stream handler is programmable and is capable of streaming according to stream protocols. From the perspective of SSM 114, all stream handlers have similar responsibilities. Each handler is designed to be the source or target for one or more data streams where each data stream moves data independently. Manager 114 is responsible for connecting a stream source to an appropriate stream target, for maintaining data flow, and cleaning up the various resources when the stream has ended. Further, the stream handlers are not device dependent modules. Although each stream handler supports streaming data of specific predefined types, data is passed form one handler to the next without any knowledge of hardware behavior. Also, audio stream handler 134 can communicate with any compatible audio device PDD in a completely hardware independent manner. To be compatible, the PDD must conform to the IDC interface as well as to the standard audio device driver interface IOCTL.

Thus as shown, stream manager 114 interacts with a plurality of stream handler dynamic link libraries (DLL) 116–126 which respectively are MIDI mapper, CD/DA, memory, split stream, CD-ROM/XA, and file system, stream handlers. File system stream handler DLL 126 calls a multimedia I/O (MMIO) manager 128 for accessing a file system 130.

Stream manager 114 also interacts through stream manager helpers 133 with an audio stream handler physical device driver (PDD) 134 that selectively accesses physical devices through a stream handler/PDD interface 136 and a plurality of PDDs 138–144. Stream manager 114 can also interact with interface 136 through inter-device communication (IDC) interfaces 146.

Figure 3:
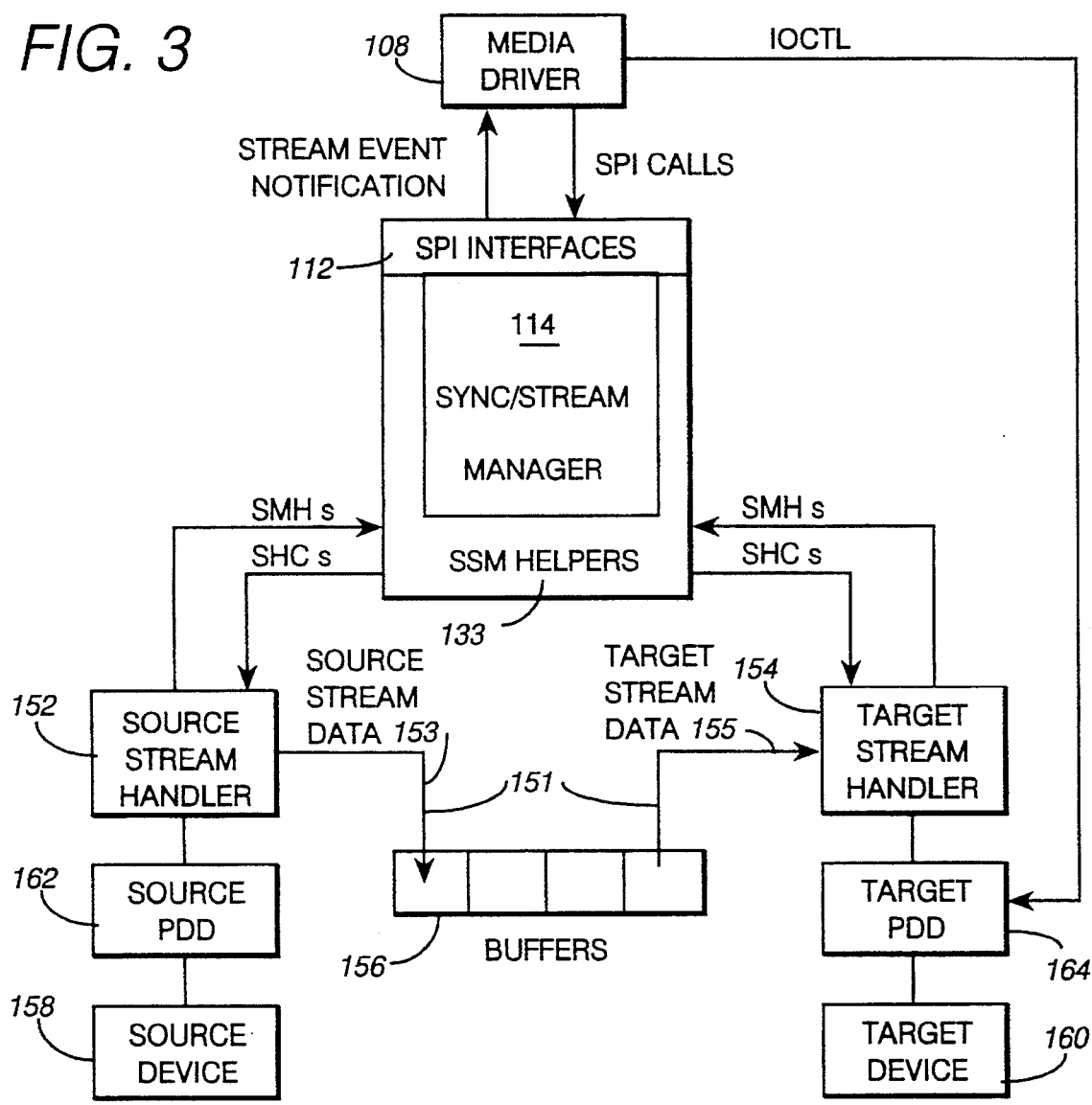
FIG. 3 is a block diagram illustrating a generalized model of data streaming.

FIG. 3 is a generalized model of data streaming operations the details of which are discussed relative to the flow charts and data structures in the remaining figures. FIG. 3 shows generally a single data stream 151 and how data flows or is transported under the control of stream manager 114, and source and target stream handlers 152 and 154. A plurality of stream buffers 156 are allocated in memory for use in streaming. Buffers 156 are filled with stream data from a source device 158 and are emptied of stream data by transmitting the data to a target device 160. Data stream 151 comprises two portions, source stream data 153 and target stream data 155. The data path for the source stream data is from source 16, through source PDD 162, and through stream handler 152 to buffers 156. The data path for the target stream data 155 is from buffers 156, through target stream handler 154, through target PDD 164, and to target device 160. Source stream handler 152 actuates a source PDD 162 which in turn controls operation of the source device. Target stream handler 154 actuates a target PDD 164 which controls target device 160. The general objective is for the source stream handler 152 to fill at least two of stream buffers 156 before the target device is started, and, once the target device has started, to thereafter keep ahead of the target device by filling buffers, until the complete source data has been transferred. After the buffers are filled, the target stream handler can then obtain target data therefrom and transfer it to the target device.

Media driver 108 interacts with SPI interface 112 by sending SPI functions or calls and receiving stream event notifications. Manager 114 interprets the SPI calls and in response thereto performs the desired functions by interacting with the stream handlers by sending system helper commands SHCs to the handlers and receiving stream manager helpers SMH calls from the handlers. Media driver 108 can also directly control PDD 164 by issuing control functions defined by standard IOCTL commands. The principal SPI calls related to the invention are SpiCreateStream and SpiStartStream which respectively setup up the desired stream(s) and then start the data streaming. Should there be plural streams that must be synchronized, a SpiEnableSync call is made.

SYNCHRONIZATION

The synchronization mechanism of the invention provides simple and effective control of real-time event synchronization. The mechanism uses constructs based on the architecture of OS/2 and exploits its preemptive, priority driven multitasking capabilities. The key elements of the synchronization mechanism are master/slave relationship, sync pulse generation, and sync pulse processing.

While FIG. 3 shows a single data stream, synchronization involves two or more streams each of which is created and managed the same as in the related application but with the addition of synchronizing the data streams in accordance with the present invention. Assuming there are two streams, the goal is to synchronize them so that they start at the same time and have their perceivable outputs synchronized to make sense to a human. An example is a video data stream synchronized with an audio data stream where the video shows a talking head with moving lips and the audio is a voice that corresponds with the moving lips. During the course of setting up the data streams, a master slave relationship is established using a sync group creation command SpiEnableSync API in which one stream is designated as the master and each remaining stream is designated a slave. For the master slave relationship, there are two forms of synchronization, master-slave independent synchronization illustrated in FIG. 4 and master-driven slave synchronization illustrated in FIG. 5.

In general, master-slave independent synchronization is characterized by have two closed-loop data streams that are independently driven by a hardware device. Each data stream is independent in that it does not need the other to maintain continuous streaming. In other words, each stream is individually controlled without affecting the other. Each stream is driven by its own output device or clock mechanism, and each stream keeps track of its own time. One of the streams is designated the master and the other streams are designated slaves. The purpose of this master slave relationship is to synchronize all slaves to the master of the sync group. Typically, the master stream is of a nature that it can interrupted on a specific interval from its hardware device, but it is not necessary. This forms the basis for the sync pulse mechanism.

For the master stream, either one of the source or target stream handlers is designated to be the sender of sync pulses. For the slave stream, either one of the source or target handlers is designated to receive sync pulses. The master handler in a sync group defines a sync pulse granularity which is the rate at which the master stream handler generates the sync pulses. Once the streams are started, the master generates the sync pulses that are sent to the synchronization manager which determines if there are any slaves and sends each one of them a sync pulse.

Each slave handler defines a sync tolerance value (TOL) which is an absolute number that represents a range of time values. The sync tolerance value is used by the synchronization manager to determine whether the slave should be sent a sync pulse or not. Since the slave is independent of the master, it has its own timing mechanism that allows it to stream data to its device continuously. Therefore, it does not rely on the master to drive the data stream from the source to the destination device. Sync pulses for this kind of relationship are really out-of-sync-pulses. The sync tolerance value is used by comparing the absolute difference between the master and slave times against TOL. If the value is greater, the slave is not sent a sync pulse and can consider the stream to be synchronized. Otherwise, the slave stream is considered to be out of sync with the master and will be notified by the sync pulse mechanism. The slave stream handler would then use the notification to adapt its streaming rate to the source stream rate by either repeating or skipping data in the stream. The slave stream handler could also adapt by actually varying the data rate of the data stream.

Adaptive resynchronization is a term with the following meaning. When a slave stream receives a sync pulse, it must at that point get back into synchronization with the master stream either by slowing down or speeding up. Adaptive resync refers to the slave stream being able to change its rate of consumption of data to match that of the master stream, instead of dropping data to speed up or repeating data to slow down. By adaptively resyncing to the master, the chances are that the streams will not get out of sync again. This saves CPU time because the CPU will not have to go through the overhead of sending a sync pulse.

A synchronization or sync pulse represents the current stream sync master "clock" value and its stream handle. The clock value is expressed in 1/3000 second units where zero represents the time the master stream was started from the beginning of its associated multimedia data object. The stream handle is a unique identifier of the stream. Sync pulses are generated on a regular basis by the master. A slave receives a sync pulses only when it is determined that it is out-of-sync with the master.

Figure 4:
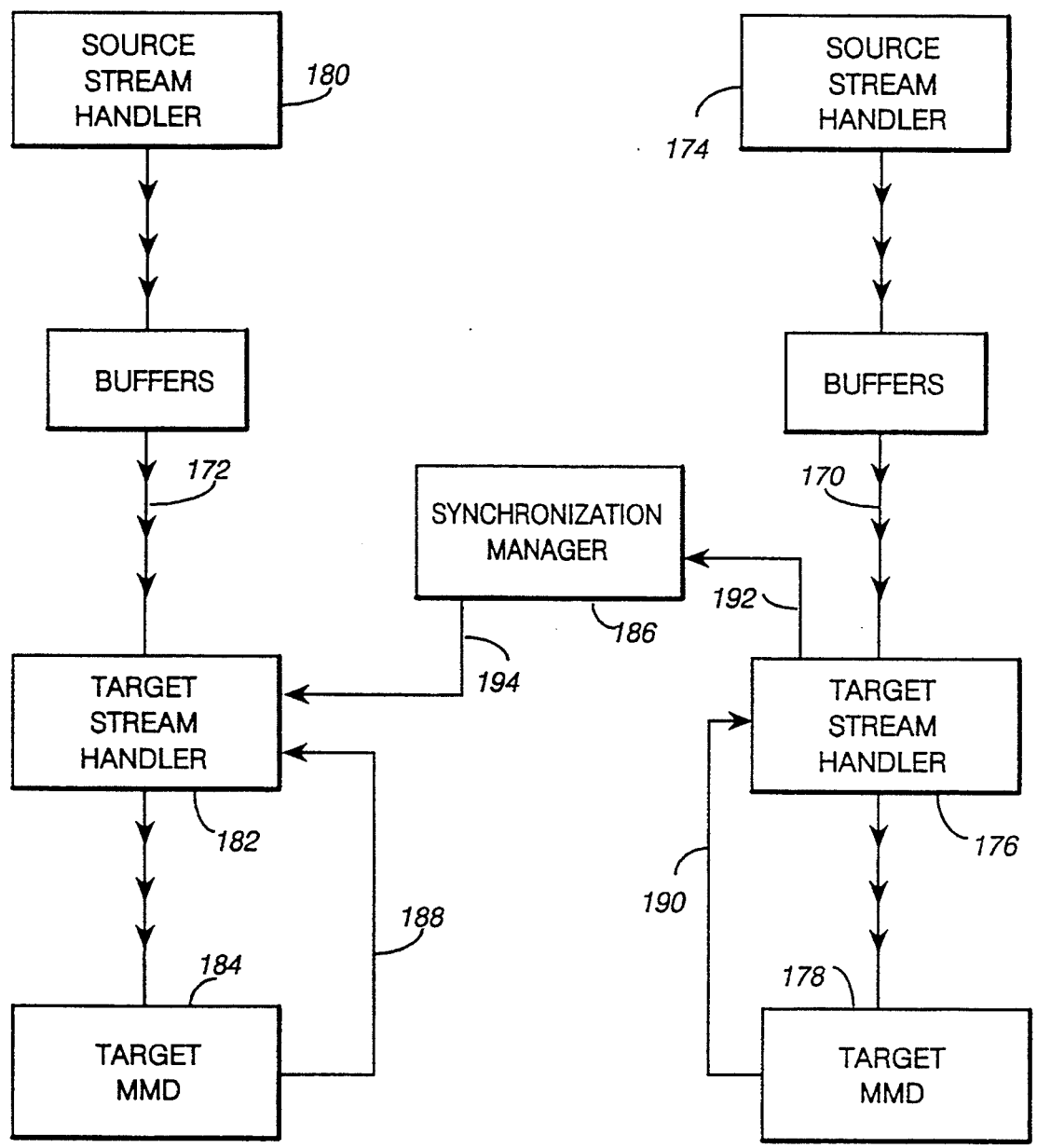
FIG. 4 is a diagram illustrating master-slave independent synchronization.

FIG. 4 illustrates the adaption of the above general discussion to the specific example shown in which two data streams 170 and 172 are provided. Stream 170 is the master stream and stream 172 is the slave stream. Stream 170 comprises a source stream handler DLL 174, a target stream handler PDD 176 to run a target MMD 178. Stream 172 comprises a source stream handler DLL 180, a target stream handler PDD 182 to run a target MMD 184. By feedbacks 190 and 188, MMDs 178 and 184 respectively drive target stream handlers 176 and 182.

Data driven synchronization means that stream time is determined by keeping track of the amount of data that has been transferred to an output device. Usually the output device continually interrupts to get a buffer of data. It will interrupt at a predefined rate that should be relatively constant. Such interrupting can then be used to keep track of stream time so that the user can specify a start time and an end time for the playback of output, and to seek within the data to a different location, on a timed basis.

Sync pulses 192 are transmitted from the Master stream to a synchronization manager (SM) 186 by target stream handler 176. Manager 176 in turn sends sync pulses 194 to the target stream handler 182 of the slave data stream 172. Sync pulses 194 allow slave target stream handler 182 to adjust the activity of the slave stream so synchronization can be maintained. SM 186 is part of SSM 114 (FIGS. 1–3).

Sync pulses are distributed by synchronization manager 186 based on the programmed stream sync relationship. This distribution is effective for both DLL and device driver slave stream handlers. Device driver stream handlers (e.g. PDD 182) receive sync pulses 194 via their sync pulse EVCB (event control block). Each slave stream handler must regularly update the sync pulse EVCB with what it believes the stream time is and SM 186 checks this slave handler stream time against the master stream time and decides whether to send a sync pulse 194 to this handler.

Device driver stream handler 182 must check for sync pulses 194 from SSM 114 by polling a flag in the sync pulse EVCB. SM 186 sets the flag to indicate a sync pulse and updates the current master stream time. Typically, the device driver slave handler will poll the flag once during interrupt processing and adjusts the stream consumption accordingly.

DLL stream handlers receive sync pulses in one of two ways, either by registering a semaphore with the Synchronization manager or by the same method as the Sync/Stream Manager uses for device driver stream handlers.

Figure 5:
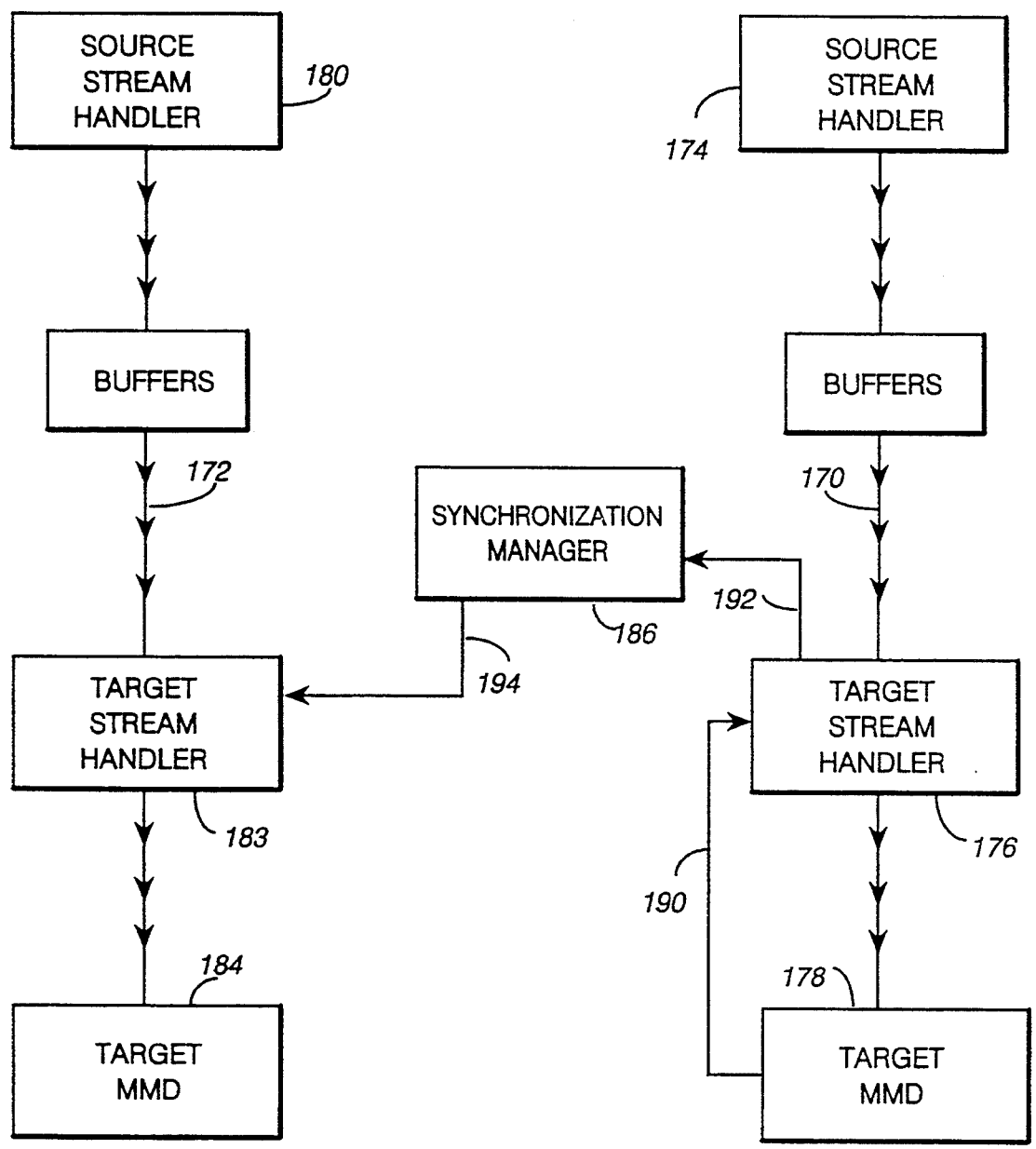
FIG. 5 is a view similar to FIG. 4 but illustrating master driven slave synchronization.

Master-driven slave synchronization is shown in FIG. 5 and is characterized by have one closed-loop data stream 170 that is driven by a hardware device 178 (master) and one or more slave data streams 172 that are driven from the master data stream. The master is independent from the slave streams and can maintain continuous streaming in a closed-loop. The master stream has its own source of timing, from either a system clock or data driven interrupts. The slave streams do not have their own timing information and are dependent on the master sync pulses 194 to maintain continuous streaming to its device (i.e. to initiate I/O to the device). The purpose of this master slave relationship is for the master to drive all the slaves of the sync group.

The master stream handler in the sync group defines sync granularity. Each slave sets the sync tolerance value to be 0 for this relationship. Each sync pulse is propagated to the each slave stream. The slave stream handler use the sync pulse as a timing mechanism to allow it continuously stream data between devices. There is no need to adapt the slave stream data rate to the master because it is driven from the master's timing intervals. The system of FIG. 5 differs from that of FIG. 4 in that feedback 188 has been omitted. Stream handler 183 receives only sync pulses 194 and is driven thereby whereby target stream handler 183 is sync pulse driven as opposed to a hardware driven handler 182.

Each stream handler (device driver or DLL) may provide sync pulse handling to support synchronization for any streams activated. Typically, the stream handler sync pulse handling logic is capable of correcting the active stream's progress in its real-time context, based on information received in sync pulse EVCB created by the stream handler and accessed by the synchronization manager. For example, if the slave's current "local" time is 45,000 (15.0 seconds in 1/3000 second units), and the master sync pulse time is 44,500 (14.83 sec), then the slave stream handler's sync pulse logic should adjust the pace of data streaming to correct (e.g. slow down, or repeat the last 170 msec worth of data). This time-adjusting (resync) logic is unique to the type of data the handler is streaming.

Since there may be occurrences of heavy system load that make it impossible for DLL sync pulse logic to get control between two sync pulses (task dispatch latency may rise intermittently to delay even time-critical threads), the handler will always take the most current master time (last sync pulse posted). A sync pulse "overrun" flag is also set by the synchronization manager. Also, the sync pulse logic and all associated control data objects must reside in fixed memory, so that these code and data pages are never paged out (at least not while the stream is active).

The sync pulse logic must be high performance by nature. Complex, time consuming synchronization adjusting routines with very long path lengths will not be able to maintain synchronization if they are dispatched continually. The sync pulse logic is a second level interrupt handler, so its performance must be optimized. If no adjustment of the stream is necessary, the routine may not need to be dispatched at all, which brings us to one final point.

The Synchronization manager has sync pulse distribution logic that controls when it will set the slave device driver stream handler's sync pulse SYNCPOLLING bit flag (The Synchronization manager does not call the handler's interface). This logic similarly controls when it will dispatch the DLL handler's thread (i.e. clear a semaphore the thread is waiting on). Typically, the DLL handler detects that a sync pulse has occurred by polling the SYNCPOLLING bit flag in its sync pulse EVCB that it gave to the Synchronization manager on return from an SHC_ENABLE_SYNC call. This SYNCPOLLING bit flag is set only when the delta between the master stream time and the slave's local time (both stored in the sync pulse EVCB) exceeds a specified resync tolerance value. The Synchronization Manager determines this delta for all slaves on each sync pulse received from the master, and only notifies the slaves when stream has deviated too much from the master stream time. Each stream handler that can receive sync pulses must provide its tolerance value (a minimum time delta expressed in 1/3000 second units) to the Synchronization manager on return from the SHC_CREATE.

Some additional rules govern the master/slave sync relationships:

1. Any stream can be a slave in only one sync relationship.

2. Stream handlers must be able to slave multiple streams (if multiple streams are supported) according to different sync masters (i.e. each active stream under that handler's control may have a different master).

3. A stream cannot become the master of two separate groups of slaves (any additional streams become slaves in the existing master/slave group).

4. Slaves may fail to maintain synchronization. This condition happens when a stream handler has not processed the last sync pulse received from the Synchronization manager and another sync pulse is received. This condition is called sync overrun. The application can optionally request by way of SpiEnableEvent to be notified of any sync overruns. The stream is not stopped. The application could request a stop once a sync overrun event is received, though.

5. The sync group (master and all slaves) may be started, stopped and seeked as a group by using the "slaves" flag on each of the following SPI functions:

SpiStartStream—Start data streaming in all grouped streams.

SpiStopStream—Stop data streaming in all grouped streams.

SpiSeekStream—Seek to a specific point in the data stream in all grouped streams.

6. Any slave in a sync relationship may be arbitrarily started or stopped without affecting the activity of the master or any other slave. The master may be stopped independently of any slave streams in the same sync group and the option is available for all of the slave to be stopped at the same time that the master stream is stopped.

7. Group synchronized stream time will always be the master stream time. This includes slave streams that have been stopped and re-started.

8. Stream seeking is done on a per stream basis. For example, a seek in a master stream does not seek in any slave streams that may be in the same sync group unless the "slaves" flag is used. If a seek operation is performed on the master, the stream must be stopped. The master stream time would also stop when the seek took place and be reset to the stream time of the seek point. If the stream was then restarted, the stream time would be restarted from the seek point. This means that stream time can be equated to position in the data as opposed to the amount of time the stream has been active.

Figure 6:
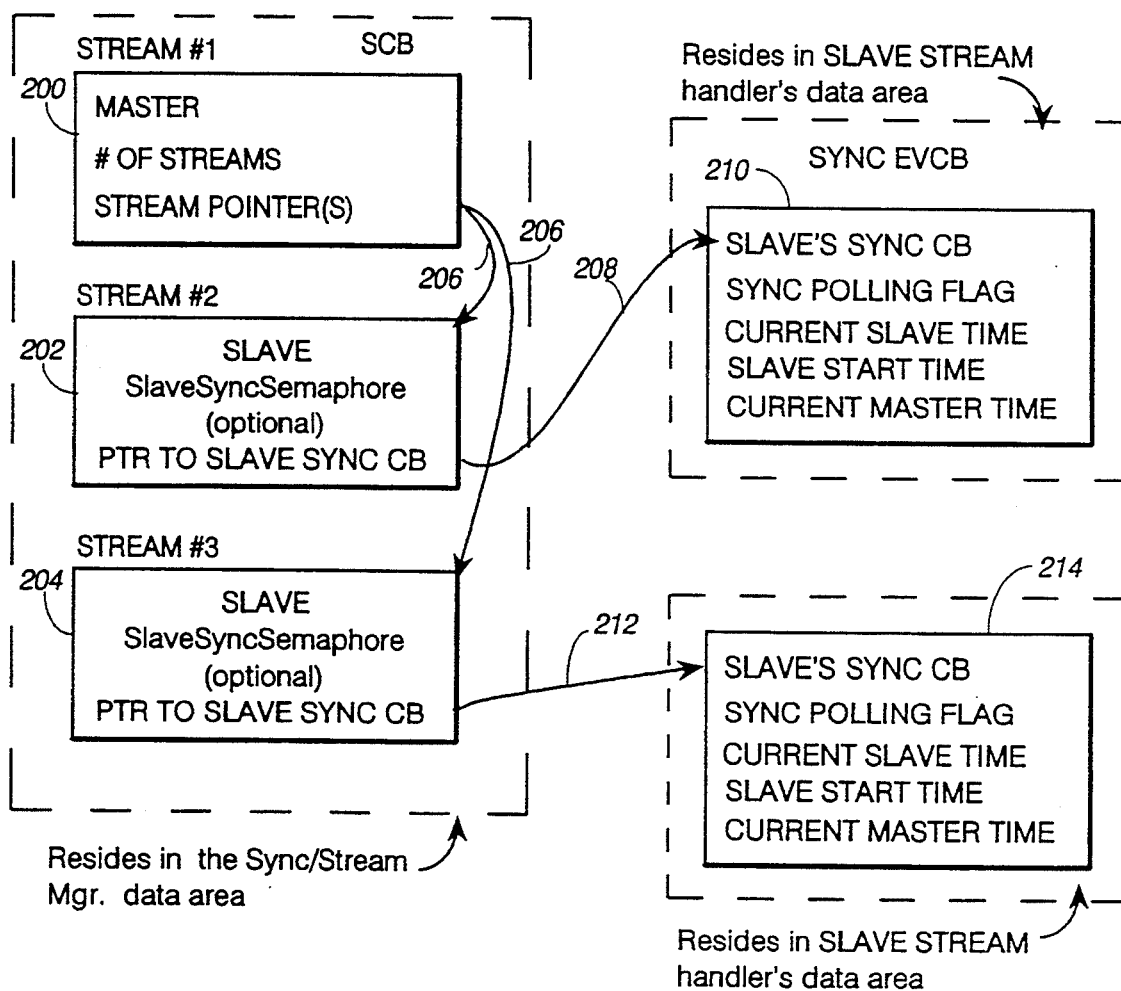
FIG. 6 is a block diagram of a synchronization data structure.

Referring to FIG. 6, a synchronization data structure is setup which includes at least two stream control blocks (SCBs) 200 and 202. SCB 200 is designated as a master and SCB 202 is designated as a slave. An SCB 204 is set up for each additional slave if there is more than two data streams to be synchronized. SCB 200 contains fields for storing information on the number of slave streams and pointers 206 to each slave stream SCB. Slave SCB 202 contains a designation that the SCB is a slave and may contain an optional slave sync semaphore. SCB 202 also contains a pointer 208 to an associated sync EVCB (event control block) 210, which is a data structure that is used to pass synchronization information between the master stream handler and the slave stream handlers. Block 210 is a slave sync control block and includes a sync polling flag, the current slave time, the slave start time, and the current master time. Blocks 204 and 214 are similarly constructed. Blocks 200, 202, and 204 resides in the sync/stream manager's data area while each of blocks 210 and 214 resides in each corresponding slave stream handlers data area.

Referring to FIG. 7, when an application program 102 issues a SpiEnableSync API call, SpiEnableSync routine 215 is executed which does the following. Step 216 adds each slave to its master's slave list in SCB 200. Step 218 determines for each slave stream and its master stream whether the source or target stream handler will generate or receive sync pulses. Step 220 then calls the master stream handler by SHC ENABLE SYNC command to tell the master that it is the master. For each slave stream, step 222 calls the slave stream handler by SHC ENABLE SYNC command to tell the handler that it will be a slave handler. Step 224 then returns to the caller.

FIG. 8 shows how the master stream handler synchronizes pulse generation. Interrupt handler 226 passes control to step 228 which determines of the I/O operation successfully completed without error. If not, step 230 reports the error to the application and then returns by step 232. If the I/O was ok, step 234 stores the current master stream time in the sync EVCB associated therewith. Step 236 then reports a sync pulse to the sync/stream manager. Step 238 initiates another I/O operation and then returns. These steps in this figure may also be combined with the steps shown in FIG. 8 of the related application.

Figure 9:
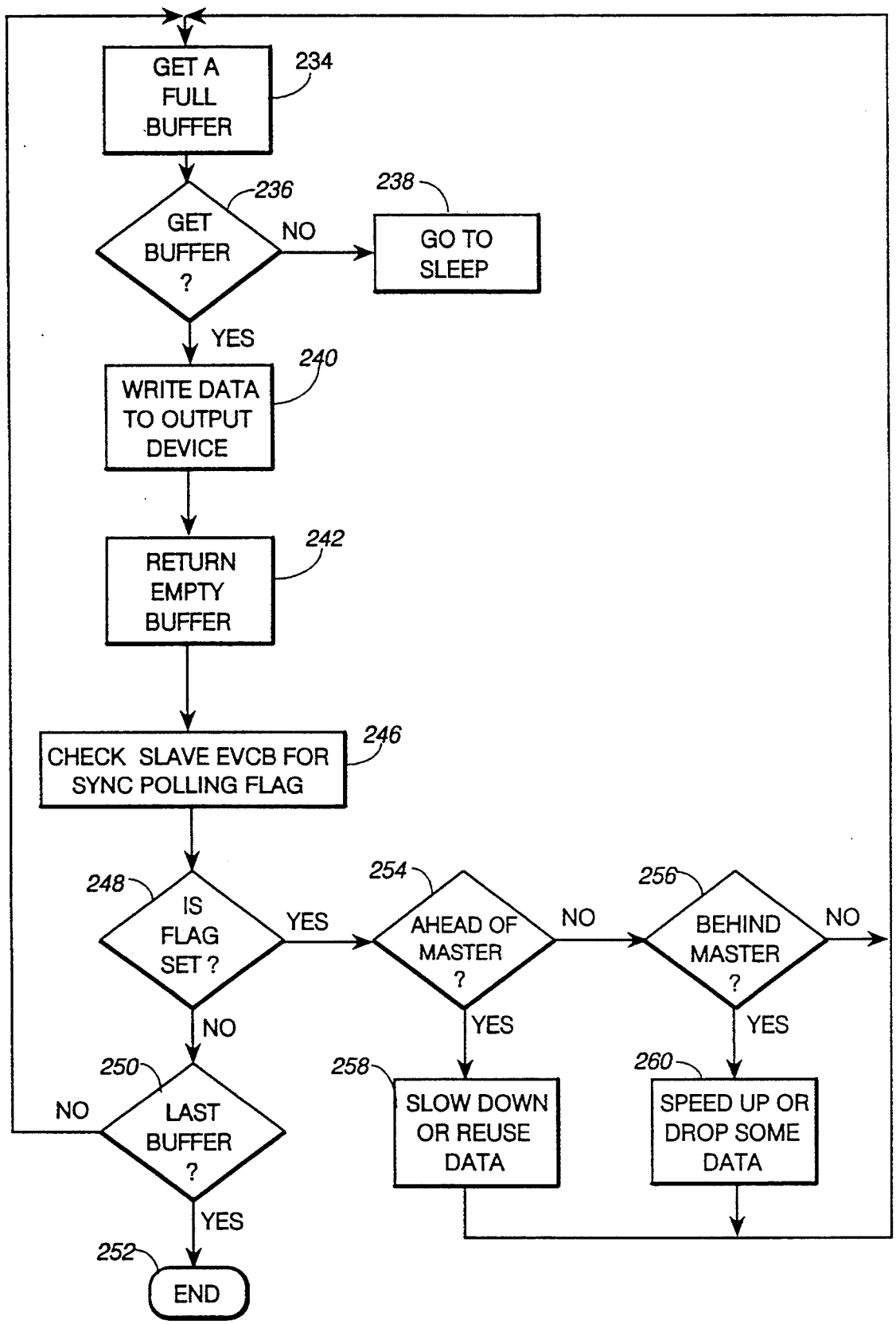

Referring to FIG. 9, step 234 attempts to get a full buffer 156. If a full buffer is not obtained, the thread is blocked and put to sleep in step 238. If a full buffer is obtained, step 240 then writes the data from the buffer to the target output device. When such writing is complete, step 242 returns an empty buffer. Step 246 checks the slave EVCB for a sync polling flag. If step 248 determines the polling flag is not set, step 250 determines if the buffer is the last one. If not, a loop is made back to step 234 et seq. If the buffer is the last one, the routine ends in step 252. If the flag is set, step 254 determines if the slave is running ahead or faster than the master. If not, step 256 determines if the slave is running behind the master, if not, a loop is made to step 234. If step 254 results in a positive determination, step 258 then slows down the rate of data transmission or reuses some of the data, and then returns to step 234. If step 256 results in a positive determination, step 260 then speed ups the rate of data transmission or drops some data, and then returns to step 234. This steps in this figure may also be combined with the steps shown in FIG. 9 of the related application.

Referring to FIGS. 10 and 11, when the slave stream handler is using semaphore to receive sync pulses instead of the sync polling flag, SHC ENABLE SYNC routine 262 creates a sync pulse thread in step 264. It then creates a sync pulse semaphore in step 266 and blocks the thread on the sync pulse semaphore. Then, when the sync pulse semaphore is unblocked in step 270, step 272 determines if the slave thread is ahead of the master stream. If so, step 274 signals the streaming thread to slow down the rate of consumption of data, and step 276 blocks the thread on the sync pulse semaphore. If step 272 results in a negative determination, step 278 checks to see if the slave stream is behind the master time. If not, step 276 is executed. If so, step 280 signals the streaming thread to speed up the rate of data consumption, and step 276 blocks. Rate of data consumption can be varied for certain data, such as video data, by varying the number of video frames per second.

Figure 12:
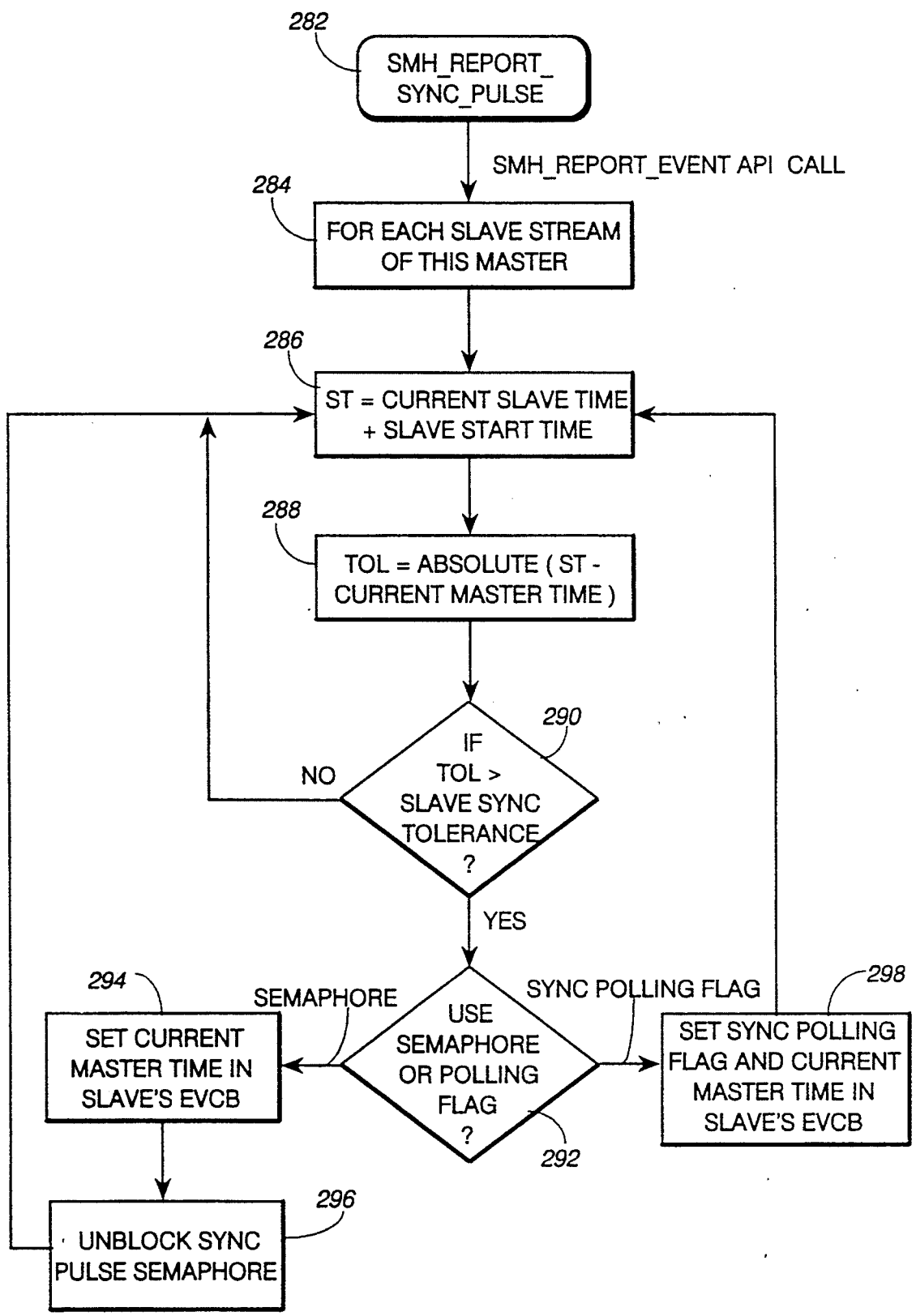

When a slave relationship is set up, the master and slave stream handlers agree upon a sync pulse tolerance value which value is an integer value that is a multiple of sync pulse granularity. For example, if a sync pulse is generated every 10 time units, then a sync tolerance of 30 could be used. The sync tolerance value is used by the synchronization manager to determine whether to send a sync pulse to a given slave stream, once the master has generated a sync pulse. Let us assume that the master stream generates sync pulses every 10 time units and the sync tolerance value is set at 30 time units. At each 10 time units, the master generates a sync pulse by calling the synchronization manager with a sync EVCB containing the current master time. Such call is made using a SMH_ReportEvent API call SMH_REPORT_SYNC_PULSE 282 (FIG. 12).

In response to call 282, the synchronization manager in step 284 performs the following steps for each slave stream in the sync group. Step 286 gets the current slave time and obtains a sum ST by adding the current slave time to the slave start time. Step 288 calculates the tolerance TOL as the absolute value of the difference between ST and the current master time. Step 290 compares the values and determines if TOL is greater than the slave sync tolerance. If not, a loop is made back to step 286. If step 290 is "yes", the sync pulse is passed on to the slave stream by one of two methods. Step 292 determines if a semaphore or a polling flag is being used. If a semaphore is being used, step 294 sets the current master time in the slaves EVCB, and step 296 unblocks the sync pulse semaphore and returns to step 286. If a sync polling flag is being used, step 298 sets the sync polling flag and the current master time in the slaves EVCB before returning to step 286. Such method saves time because the slave won't be called with each sync pulse but only when it is really out of sync with the master stream.

There are two further advantages that should be noted. First, the sync/stream subsystem is implemented as a software solution. It is set of APIs that have been generalized to handle many different kinds of data. Second, the sub-system is hardware device independent so that it can be implemented for a variety of machines to take advantage of different hardware. For any new type of output device, a new stream handler would have to be written to contain any hardware dependent software needed to transport data to the new type.

It should be apparent to those skilled in the art that many changes can be made in the details and arrangements of steps and parts without departing from the scope of the invention as defined in the appended claims.

What is claimed is:

1. A multimedia data processing system comprising:
a personal computer having a memory for storing a multimedia application program and a multitasking operating system, and a processor for executing said application program and operating said multimedia data processing system under said operating system;
master stream means connected to said personal computer for producing a master data stream in response to commands from said multimedia application program, said master stream means including a master source device for producing first media data, a master target device for receiving said first media data from said master source device, and master stream handling means for producing a master data stream in which said first media data flows along a first path from said master source device to said master target device;
slave stream means connected to said personal computer for producing a slave data stream in response to commands from said multimedia application program, said slave stream means including a slave source device for producing second media data, a slave target device for receiving said second media data from said slave source device, and slave stream handling means for producing a slave data stream in which said second media data flows along a second path from said slave source device to said slave target device, said second path being completely separated from said first path;

said master target device and said slave target device producing, in response to receiving said master data stream and said slave data stream, two different time-dependent humanly-perceivable outputs; and synchronizing means operable under said operating system for synchronizing said slave data stream with said master data stream to maintain time-dependency between said outputs of said target devices, said synchronizing means comprising a synchronization manager;

first means for periodically storing timing pulses in said memory, each timing pulse indicating current time of said master data stream relative to when said master data stream was started;

notifying means for notifying said synchronization manager each time one of said timing pulses is stored in said memory;

second means for periodically storing, in said memory, indications of current time of said slave data stream;

said synchronization manager includes third means, operative in response to receiving notification from said notifying means, for comparing current time of said master data stream with current time of said slave data stream and selectively notifying said slave stream handling means; and said slave stream handling means further includes fourth means, operative in response to receiving notification from said synchronization manager, for transmitting second media data to said slave target device.

2. A multimedia data processing system in accordance with claim 1 wherein said first means further comprises:

fifth means for periodically generating interrupts;

and interrupt handling means for handling each interrupt and storing said timing pulses in said memory in response to each interrupt.

3. A multimedia data processing system in accordance with claim 2 wherein said fifth means is data driven and generates an interrupt each time said target device produces an output in response to receiving first media data from said master data stream.

4. A multimedia data processing system in accordance with claim 3 wherein said slave stream handling means comprises sixth means for comparing said current time of said master data stream with current time of said slave data stream and synchronizing data flow in said slave data stream in accordance with such comparison.

5. A multimedia data processing system in accordance with claim 4 wherein said sixth means synchronizes said slave data stream by dropping data from said slave data stream when the current time of said slave data stream is faster than the current time of said master data stream, and by repeating data in said slave data stream when the current time of said slave data stream is slower than the current time of said master data stream.

6. A multimedia data processing system in accordance with claim 4 wherein said sixth means synchronizes said slave data stream by speeding up data flow rate in said slave data stream when the current time of said slave data stream is slower than the current time of said master data stream, and by decreasing data flow rate in said slave data stream when the current time of said slave data stream is faster than the current time of said master data stream.

7. A multimedia data processing system in accordance with claim 4 wherein said synchronization manager comprises seventh means for comparing said current time of said master data stream with current time of said slave data stream and generating an out-of-sync signal only when the difference between said times exceeds a predetermined amount, said out-of-sync signal being sent to said slave stream handling means.

8. A multimedia data processing system in accordance with claim 2 wherein:

said fifth means generates said interrupts at a rate at which said master target devices completes output operations; and said slave stream handling means includes seventh means for driving said slave target device at said rate at which said fifth means generates said interrupts.

9. A multimedia data processing system in accordance with claim 2 comprising:

a slave event control block stored in said memory and containing a plurality of fields including a first field for storing said current time of said master data stream, and a second field for storing said current time of said slave data stream; and said interrupt handling means stores said current time of said master data stream in said first field, and said second means stores said current time of said slave data stream in said second field.

10. A multimedia data processing system in accordance with claim 9 wherein said slave event control block further includes a polling flag settable by said third means of said synchronization manager, to notify said slave stream handling means; and said slave stream handling means comprises polling means for polling said polling flag and reading said current time of said master data stream each time said polling is set.

11. A multimedia data processing system in accordance with claim 9 comprising:

said operating system includes a facility for blocking on semaphore flags;

said slave stream handling means blocks on a sync semaphore flag; and said third means, in said synchronization manager, includes eighth means which notifies said slave stream handling means by unblocking said sync semaphore flag.

12. A multimedia data processing system in accordance with claim 4 wherein one of said target devices produces a visual output in response to receiving image media data and the other one of said target devices produces a sound output in response to receiving audio media data, said visual output and said sound output being synchronized with each other.

* * * * *